April 21, 1970     H. H. WOLFF     3,507,989
MULTIPLE OBSERVATION SYSTEM
Filed Jan. 27, 1967     3 Sheets-Sheet 1

INVENTOR.
Hanns H. Wolff

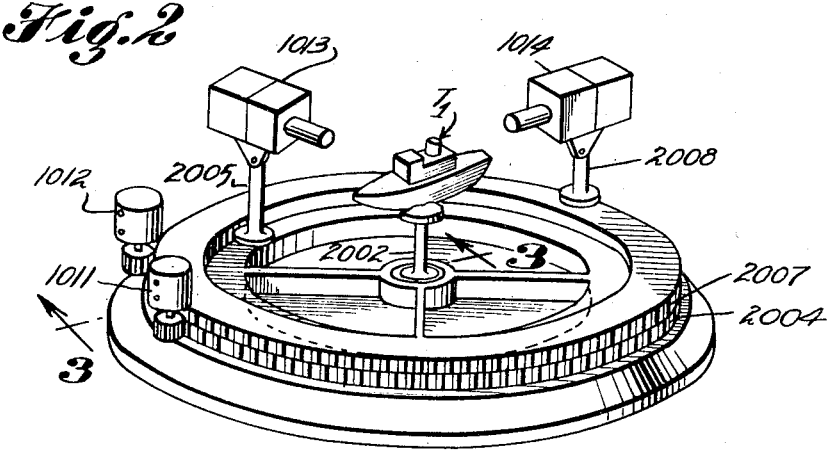
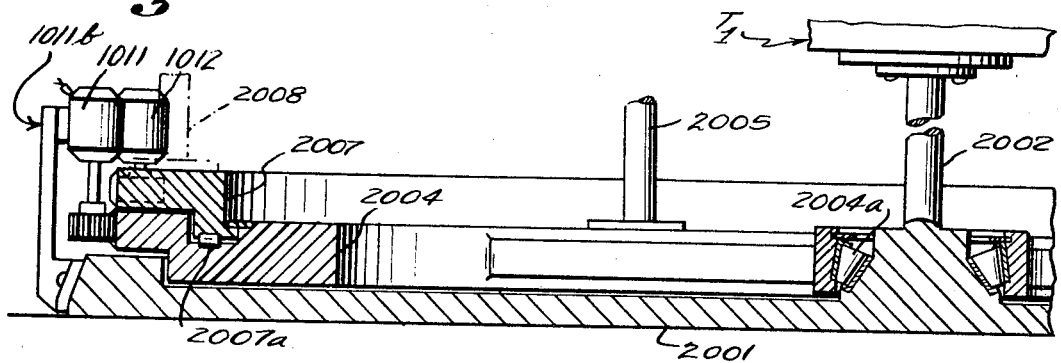
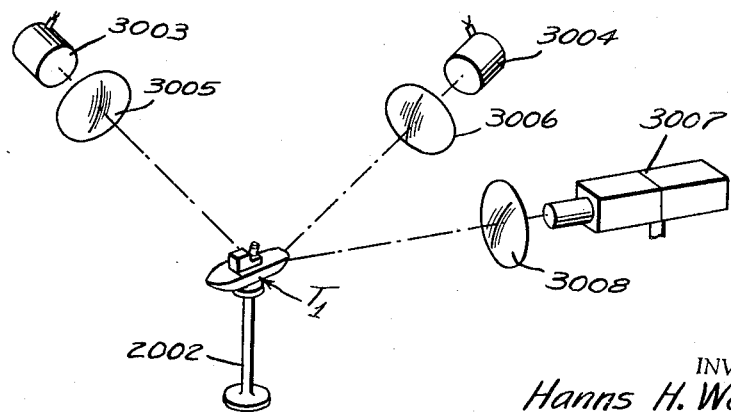
INVENTOR.
Hanns H. Wolff
BY
John M. Pease

INVENTOR.
Hanns H. Wolff

United States Patent Office 3,507,989
Patented Apr. 21, 1970

3,507,989
MULTIPLE OBSERVATION SYSTEM
Hanns H. Wolff, Orlando, Fla., assignor to the United States of America as represented by the Secretary of the Navy
Continuation-in-part of application Ser. No. 580,835, Sept. 20, 1966, which is a continuation-in-part of application Ser. No. 535,659, Mar. 14, 1966. This application Jan. 27, 1967, Ser. No. 612,770
Int. Cl. H04n 7/06
U.S. Cl. 178—6.8                                   7 Claims

ABSTRACT OF THE DISCLOSURE

A simulator system using television techniques. Movable targets are observed by a plurality of groups of cameras which feed information through blanking and synthesizing circuits to a plurality of displays, each of which simulates the observation station of a periscope. Each periscope may in turn be represented by a movable model target observable in other periscopes. The system is controlled by continuous data from a computer which is in turn controlled by variable target course control means so that the view at each periscope is continuously modified to conform to the current position of both the targets and the observing periscopes.

---

The invention described herein may be manufactured and used by or for the Government of the United States of America for governmental purposes without the payment of any royalties thereon or therefor.

CROSS REFERENCES TO RELATED APPLICATIONS

This application is a continuation-in-part of application Ser. No. 580,835, now Patent No. 3,420,953, filed Sept. 20, 1966, which is a continuation-in-part of application Ser. No. 535,659, filed Mar. 14, 1966. These co-pending applications described apparatus for causing apparent motion such as change of position (azimuth, elevation and/or range) of model ship targets or other objects displayed on a cathode ray display which simulates a periscope. Electronic means are provided for blanking out the video signals from a television camera which represent that portion of a target or background image which is obscured by a nearer target or object in the same line of sight of the simulated periscope. Co-pending application Ser. No. 613,980, filed Feb. 1, 1967, describes apparatus for blanking the image of a target beyond or below the horizon.

BACKGROUND OF THE INVENTION

The invention disclosed is a simulating system particularly adapted to Naval training problems. In co-pending applications Ser. No. 535,659 and Ser. No. 580,835, now Patent No. 3,420,953, there is described simulating apparatus wherein a scene including ship targets apparently movable against a seascape is synthesized on a cathode ray type display simulating a single periscope observation point. While this apparatus effectively simulates Naval problems involving a single submarine, there has long existed a need for a simulating system for presenting a Naval scene from several observation points such as several periscopes. The present invention solves that problem.

SUMMARY OF THE INVENTION

An object of the present invention is to provide a plurality of display or observation points in a simulator system of the general type taught in the above mentioned co-pending applications, so that scenery, targets and/or other objects in a Naval environment may be observed from different observation points, and if desired, to represent each observation point by a model observable as a target at the other displays. The present embodiment discloses by way of example a simulator system for synthesizing the views seen from a submarine periscope on a display. A scene including background, ships, periscopes, and other objects or "targets," any or all of which may be represented by models, transparencies, etc., is synthesized on several television type displays, each of which is arranged to simulate the observation station of a periscope, which periscope may also be represented by a model to be a movable target for other periscopes. The target models and/or background scenery are individually observed by respective pluralities of television cameras. The cameras may be fixed so that each camera of a given plurality views one of duplicate targets which are individually rotated by servo drive means. Alternatively, the cameras may be mounted on individual rotatable plates which are rotated by servo drive means so that each camera circles around each target or object to obtain a view from any desired azimuthal position. An individual camera for each target or object of interest in a scene is connected to each periscope display through the blanking and synthesizing circuits described in the above mentioned co-pending applications. Target course control means are provided to control the apparent motion of the targets and a motion control computer is provided to compute values such as range, shoreline range, angle on the bow, etc., for each target as seen from each periscope, and to supply these data to servo drive means, apparent motion circuits, and blanking and synthesizing circuits. These circuits act to change the position and range of the targets seen in the displays and to blank the camera video signals originating from those parts of a target which are obscured by those of a nearer target or object in the same line of sight.

BRIEF DESCRIPTION OF THE DRAWINGS

The invention resides in novel combinations and arrangements of parts described more fully hereinafter with reference to the drawings in which:

FIG. 2 shows a camera scanning system similar to some shown in FIG. 1 but with movable camera means;
FIG. 3 shows a cross sectional view of the apparatus of FIG. 2;
FIG. 4 shows a target model lighting apparatus.

DESCRIPTION OF THE PREFERRED EMBODIMENTS

Figure 1:
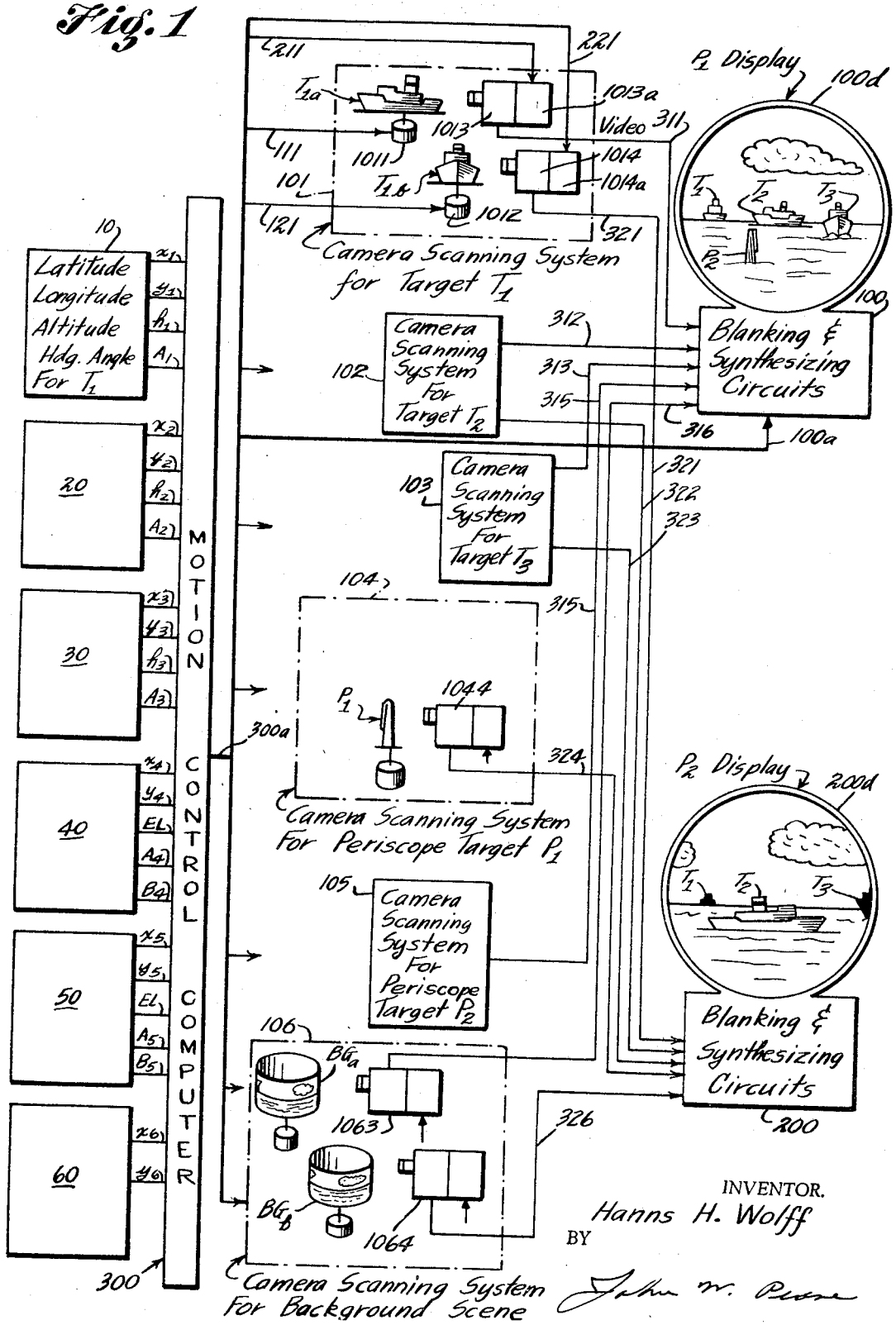
FIG. 1 shows the general organization of the invention.

In the form of the invention illustrated in the drawings and described hereinafter, and with particular reference now to FIG. 1, there is provided a simulation apparatus for training personnel in submarine warfare or the like. A plurality of target course control means 10, 20, 30, 40 and 50 having output leads $x$, $y$, $h$, etc., are connected to furnish target position, course, and other information concerning targets such as model ships $T_1$, $T_2$ and $T_3$ shown here as duplicates $T_{1a}$, $T_{1b}$, etc. and model periscopes $P_1$ and $P_2$ to a motion control computer 300. Target course control 60 furnishes latitude and longitude data for a seascape background replica BG. Target course controls 10, 20 etc. may be any known input means suitable for feeding information to a general purpose computer. The outputs of motion control computer 300 are connected by multiconductor output cable 300a to control camera scanning systems 101, 102, 103, 104, 105 and 106 and blanking and synthesizing circuits 100 and 200. To avoid complication of the drawing only representative conductors or lines of output cable 300a from computer 300 are shown in FIG. 1. One branch of 300a, multiconductor line 100a, is shown connected to furnish range and blanking information to a blanking and synthesizing circuit 100. Line 211 is connected to an apparent motion circuit 1013a (shown here as integrally housed with a camera 1013) in a camera scanning system 101. Line 111 is connected to a servo drive 1011 in camera scanning system 101. Lines 221 and 121 are connected to apparent motion circuit 1014a and servo drive 1012 in system 101 in a like manner. Not shown are similar connections to blanking and synthesizing circuit 200 and to all the apparent motion circuits and servo drives in camera scanning systems 102, 103, 104, 105 and 106.

Each camera scanning system includes one or more television cameras such as 1013 and 1014 in camera scanning system 101. Each camera has attached thereto an apparent motion circuit such as 1013a and 1014a attached to cameras 1013 and 1014. (Shown here for convenience as integrally housed.) The camera scanning systems are similar except that 104 and 105 have only the camera while 101, 102, 103 and 106 have two cameras each. 102, 103, and 105 are shown as blocks to simplify the drawing. A camera scanning system could have any reasonable number of cameras depending on the number of displays desired in a particular simulator. Only one camera is required to observe a particular periscope target such as $P_1$ in the two periscope display system shown because a periscope does not observe itself. The model periscope target $P_1$ shown in camera scanning system 104 represents the outside appearance of a periscope as seen by an observer through another periscope $P_2$.

Cameras 1013 and 1014 furnish video information through lines 311 and 321 to blanking and synthesizing circuits 100 and 200 respectively. 100 and 200 are connected to periscope displays 100d and 200d respectively. 100d and 200d are television type displays arranged to simulate the observation station of a periscope and the picture shown thereon represents the scene that could be be seen by an observer looking through periscope $P_1$ and $P_2$. Camera 1044 of camera scanning system 104 observes the model periscope target $P_1$. Camera scanning system 105 observes the model periscope target $P_2$. Cameras 1063 and 1964 of camera scanning system 106 observe duplicate background scenes $BG_a$ and $BG_b$.

In the embodiment shown in FIG. 1, there is a duplicate target model for observation by each camera of its associated camera scanning system (except in camera scanning systems 104 and 105 which each observe a single periscope target). The number of cameras is dictated by the number of displays in the apparatus. Thus there are two duplicate target models $T_{1a}$ and $T_{1b}$ observed by camera 1013 and 1014 in camera scanning system 101. Duplicate target models $T_{1a}$ and $T_{1b}$ are rotated by servo drives 1011 and 1012 respectively in response to information signals from motion control computer 300, which information is computed from the information received from target course controls 10, 40 and 50. Thus the images of $T_{1a}$ and $T_{1b}$ seen in displays 100d and 200d have the appearance of a ship on a course and heading and at a position determined by the inputs to target course control 10 and as observed from two periscopes with the course, train angles, etc., determined by inputs to target course controls 40 and 50.

Since a camera of scanning systems 101, 102, 103, and 106 and the camera of 105 are connected by lines 311, 312, 313, 315 and 316 to blanking and synthesizing circuit 100 which is connected to the periscope $P_1$ display 100d, the view observable at the $P_1$ display will include everything observed by the said cameras, that is Targets $T_1$, $T_2$, $T_3$, $P_2$, and background scene BG as shown. This is true provided the inputs to computer 300 from target motion controls 10, 20, 30 and 50 are such that the respective targets are within range and field of view. Similarly, cameras in systems 101, 102, 103, 104 and 106 are connected to the periscope $P_2$ display 200d by lines 321, 322, 323, 324 and 326 to show the objects and scenery observed.

The function of the synthesizing circuits in blocks 100 and 200 is to combine the video information from the connected cameras in the manner taught by co-pending applications 535,659 and 580,835, now Patent No. 3,420,953.

The blanking circuits in blocks 100 and 200 operate in the manner taught in said co-pending applications and co-pending application Ser. No. 613,980, in response to range and elevation information so that the video signals from a camera scanning a target are wholly or partially blanked by those from a camera scanning a nearer object in the same line of sight, for example a nearer target, shoreline, or horizon.

The apparent motion circuits such as 1013a and 1014a connected to cameras 1013 and 1014 in scanning system 101 contain the pulse, pulse delay, and sweep circuits described in co-pending applications 535,659 and 580,834, and act in the manner described therein to cause the images of targets $T_1$, $T_2$, $T_3$, $P_1$ and $P_2$ in the periscope $P_1$ and $P_2$ displays 100d and 200d to appear to move in accordance with the information from motion control computer 300.

In the example illustrated in FIG. 1, the data from target course controls 10, 20, 30, 40, 50 and 60 are such that the view observed from periscope $P_1$ shown on display 100d has periscope $P_2$ in the foreground, a stern view of $T_1$ on the horizon, a side view of $T_2$, and a head-on view of $T_3$, at closer ranges. The view from periscope $P_2$ on display 200b shows a side view of $T_2$ in the foreground and $T_1$ partially beyond or below the horizon in the background scene. Only the upper parts of $T_1$ are visible above the horizon. The bow of target $T_3$ is just entering the field of view on the right. The range data from target course control 40 is such that $P_1$ is beyond the horizon and thus blanked out of the view on 200b.

Target course controls 40 and 50 have a plurality of output lines to control longitude $x$ and latitude $y$ (as a function of time), altitude $h$, heading angle A and train angle B of periscope $P_1$ and $P_2$. Subscripts, e.g. $x_4$, indicate the target course control system with which an output line is associated. Similar outputs excepting one for train angle B, are provided to control the positions of targets $T_1$, $T_2$ and $T_3$. Two output lines are provided to adjust longitude and latitude of model background scene BG.

Referring now to FIG. 2, there is shown another embodiment of the camera scanning systems shown in FIG. 1. Here the arrangement is similar to that of FIG. 1 except that in the camera scanning system of FIG. 2 the cameras such as 1013, 1014, etc., are mounted on pedestals 2005 and 2008 fixed to rotatable plates 2004 and 2007. These plates are rotated by servo drives such as 1011 and 1012 to move the cameras in circular paths around their respective targets, e.g. $T_1$, as directed by control information from motion control computer 300. The ship targets such as $T_1$ shown on pedestal 2002 remain stationary while the cameras assume the required azimuthal position. In this embodiment only one model target such as $T_1$ is required for each scanning system rather than duplicate model targets such as $T_{1a}$ and $T_{1b}$ of FIG. 1.

FIG. 3 shows a sectional view of the camera supporting and driving apparatus of FIG. 2. A circular base 2001 has in the center a pedestal 2002 which is designed to support target models such as $T_1$. Plate 2004 carrying camera mounting pedestal 2005 is supported by bearings 2004a to revolve around pedestal 2002. Plate 2007 carrying a camera mounting pedestal 2008 is supported by bearings 2007a to rotate on plate 2004. A servo drive 1011 for rotating plate 2004 is shown fixed by a supporting bracket 1011b to base 2001.

FIG. 4 shows apparatus for providing a well lighted target. Undesirable reflections can be avoided by coating the target with luminescent (fluorescent or phosphorescent) material that will radiate in the visible spectrum when excited by ultra-violet radiation. It is advisable to eliminate visible light from the ultra-violet source and to prevent ultra-violet light from entering the camera. A coated target $T_1$ on pedestal 2002 and ultraviolet light sources 3003 and 3004 are shown. Ultra-violet filters 3005 and 3006 pass the desired ultra-violet spectral lines but block the passage of visible light. Camera 3007 which is sensitive to the visible spectrum has a filter 3008 which passes the visible spectrum but blocks any direct or reflected ultra-violet light.

Figure 5:
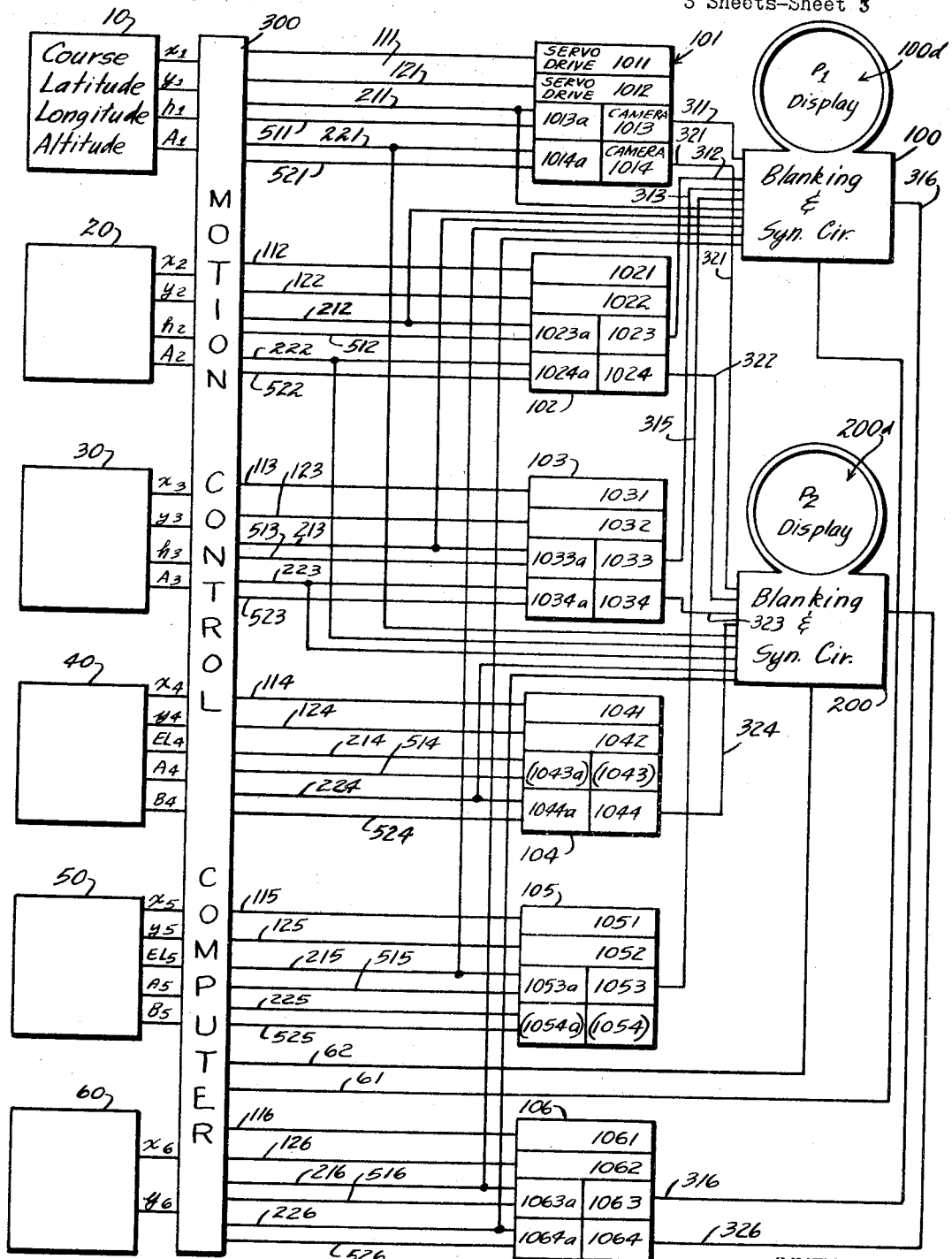
FIG. 5 shows a block diagram of the invention.

In FIG. 5 a block diagram of the invention is shown in a possible form of embodiment in which six camera scanning systems are used the camera scanning systems 101, 102, and 103 observing targets and camera scanning system 106 observing background, all common to observation by periscopes $P_1$ and $P_2$, a camera scanning system 104, which may represent the periscope $P_1$ for observation by periscope $P_2$ and therefore may need only one servo drive (or no servo drive if only a periscope and no submarine presentation is desired), and one camera, and a camera scanning system 105 representing periscope $P_2$ for observation by periscope $P_1$ and therefore also needing only one servo system (or no servo system at all) and one camera. In case of more than two periscope displays additional cameras and apparent motion circuits indicated by (1043) (1043a) (1054) and (1054a) are needed.

If no submarine presentation is required the target (periscope)-camera scanning systems 104 and 105 with attachments can be of the form described in application Ser. No. 535,659.

Each apparent target motion, including the periscope motion, is controlled by a target course control, targets $T_1$, $T_2$ and $T_3$ by target course controls 10, 20 and 30 respectively, periscope $P_1$ by course control 40 and periscope $P_2$ by course control 50. The background (shoreline and seascape) information is generated by background control 60. Each of the course controls 10, 20, 30, 40 and 50 generates longitude $x$, latitude $y$, altitude $h$ and heading angle A of the targets. Controls 40 and 50 also generate the train angles B of the two periscopes. They supply these data on a continuous basis to the motion control computer 300, indicated by feedlines $x_1$, $y_1$, $h_1$, $A_1$, $x_2$, $y_2$, $h_2$, $A_2$, $x_3$, $y_3$, $h_3$, $A_3$, $x_4$, $y_4$, $h_4$, $A_4$, $B_4$, $x_5$, $y_5$, $h_5$, $A_5$ and $B_5$. Background control 60 generates location data $x_6$ and $y_6$, which allows the computer 300 to calculate shoreline range data for the two periscopes.

The motion control computer 300 computes the angle on the bow under which the targets $T_1$ through $T_3$ and $P_2$ appear as seen from periscope $P_1$ and control by these azimuth data via lines 111, 112, 113 and 115, the servo systems 1011, 1021, 1031 and 1051 of the camera scanning systems 101, 102, 103 and 105, which rotate the duplicate targets $T_{1a}$, $T_{2a}$, $T_{3a}$ and periscope targets $P_2$ to the proper position to be observed by cameras 1013, 1023, 1033 and 1053, or move the cameras into the proper azimuthal position with respect to their targets if the arrangement shown in FIG. 2 is used. The motion control computer 300 also computes the azimuth of the camera 1063 controlled via line 116 and servo drive 1061 as a function of periscope train angle and observation position for periscope $P_1$, or rotates a duplicate background replica $BG_a$ in the manner described above.

The motion control computer 300 correspondingly the angle on the bow targets $T_1$, $T_2$ and $T_3$ and the periscope $P_1$ as seen from the position of the periscope $P_2$ and controls via lines 121, 122, 123, and 124 the servo systems 1012, 1022, 1032 and 1042, which rotate the duplicate targets $T_{1b}$, $T_{2b}$, $T_{3b}$ and periscope target $P_1$, or position the cameras 1014, 1024, 1034 and 1044 into the proper azimuth position in the manner described above for observation by periscope $P_2$. Servo system 1062 is controlled via line 126 to position camera 1064 for observation of that part of the scenery which should be visible to periscope $P_2$ depending on the periscope's position and train angle, or, duplicate background replica $BG_b$ is rotated accordingly.

For a better understanding it shall be noted that the blocks 1013a, 1014a, 1023a, 1024a, 1033a, 1034a, (1043a), 1044a, 1053a, (1054a), 1063a and 1064a, shown next to respective cameras 1013, 1014, etc., represent pulse, pulse delay and sweep circuitry comprising the apparent motion circuits described in applications Ser. Nos. 535,659 and 580,835.

The motion control computer 300 computes the range between periscope $P_1$ versus targets $T_1$, $T_2$ and $T_3$ and periscope $P_2$ and also computes the angles between the periscope view center line and the line of sight of each target as well as the elevation angle of each target. The range and angle data are fed via lines 211, 212, 213 and 215 (symbolic for range data) and 511, 512, 513 and 515 (symbolic for angle data) to apparent motion circuits 1013a, 1023a, 1033a and 1053a where they are used in accordance with applications Ser. Nos. 535,659 and 580,835. The range data are also fed to the synthesizing and blanking circuit 100, as described in applications Ser. Nos. 535,659 and 580,835, and application Ser. No. 613,980. Range and angle data of the background (shoreline) are fed via lines 216 and 516 to the apparent motion circuit 1063a for camera 1063 which observes the background for periscope $P_1$.

The motion control computer 300 correspondingly computes the range between periscope $P_2$ on one hand and the three targets $T_1$, $T_2$ and $T_3$, periscope $P_1$ and the background on the other as well as the relative bearing and elevation angles and feeds this information over lines 221, 222, 223, 224 and 226 (symbolic for range data) and over lines 521, 522, 523, 524 and 526 (symbolic for angle data) to apparent motion circuits 1014a, 1024a, 1034a, 1044a and 1064a to control cameras 1014, 1024, 1034, 1044 and 1064. The range data are also fed to the synthesizing and planking circuit 200 for periscope $P_2$.

For targets that disappear partially or totally behind the horizon the motion control computer 300 derives periscope elevation information which is converted into blanking information in blanking and synthesizing circuit 100 for observation as seen from periscope $P_1$ and in blanking and synthesizing circuit 200 for observation as seen from periscope $P_2$. Horizon range information of periscope $P_1$ is fed via line 61 to blanking and synthesizing circuit 100 and horizon range of periscope $P_2$ is fed via line 62 to blanking and synthesizing circuit 200, where it is utilized in the manner taught in co-pending application Ser. No. 613,980.

Finally the video signals from cameras 1013, 1023, 1033, 1053 and 1063 are fed over lines 311, 312, 313, 315 and 316 into blanking and synthesizing circuit 100 and the video signals from cameras 1014, 1024, 1034, 1044 and 1064 are fed over lines 321, 322, 323, 324 and 326 into blanking and synthesizing circuit 200. Additional connections between the cameras and the blanking and synthesizing circuit required and described in the applications referenced above are not shown.

Obviously many modifications and variations of the present invention are possible in the light of the above teachings. It is therefore to be understood that within the scope of the appended claims the invention may be practiced otherwise than as specifically described.

What is claimed is:

1. In a simulator system having means for synthesizing a view on a particular display means, the improvement comprising:

a plurality of display means, means for causing each display means of said plurality to display a part of a larger scene, means for determining the part displayed by each of said display means at a particular time in accordance with an apparent location of each said display means with respect to said larger scene at said particular time, a plurality of models, said plurality of models comprising a model representing the exterior appearance of each respective display means, means for synthesizing a view comprising a selected number of said models discernable against a background on each display means, said background comprising said part of said larger scene, and means for causing the model representing the exterior appearance of one of the plurality of said display means to appear in the view displayed by said particular display means when the apparent position of one of the plurality of said display means is located with the particular part of said larger scene displayed by said particular display means.

2. The simulator system of claim 1, said means for synthesizing a view having a plurality of control positions, including a position wherein said synthesized view comprises a plurality of movable objects, a position wherein said synthesized view comprises a background scene, and a position wherein said synthesized view comprises a background scene and a selected number of movable objects, and wherein each display means as represented by one of said models is displayed by the other display means, said system including adjustable motion control means whereby apparent motion may be imparted to each said movable object, and blanking means whereby all or part of any object may be blocked from view by a nearer object or scenery.

3. The simulator system of claim 2, wherein said motion control means comprise course control means for establishing a course for said movable objects and motion control computer means responsive to said course control means for continuously computing the range and attitude of said movable objects.

4. The simulator system of claim 3, wherein said means for synthesizing a view comprise camera scanning means connected to blanking and synthesizing means, said blanking and synthesizing means being connected to said display means to furnish an input thereto, said motion control computer means being connected to said camera scanning means and to said blanking and synthesizing means to control the operation thereof so that the image of said movable objects displayed by said display means changes in accordance with the adjustment of said course control means.

5. The simulator system of claim 4, wherein said camera scanning means comprise a plurality of groups of cameras, one group for each movable object or background scene, camera mounting and servo drive means for positioning said targets, and pulse, pulse delay, and sweep circuit means, said movable objects comprise targets, and said display means comprise television display means simulating a periscope, said computer means being connected to control said servo drive means, said pulse, pulse delay, and sweep circuit means, and said blanking and synthesizing means and connecting means between said camera scanning means and said blanking and synthesizing means whereby the view of said targets on said periscopes is controlled by said computer means in accordance with the adjustment of said course control means.

6. The simulator system of claim 5 wherein said servo drive means drive said cameras to computed azimuthal positions around stationary targets.

7. In a simulator system having means for synthesizing a view on display means, the improvement comprising: a plurality of groups of television cameras, each group in a separate camera scanning system, at least one of said camera scanning systems comprising a background scene, others of said camera scanning systems comprising target means, means mounting said background scene and target means in position for observation by said cameras, means for obtaining relative movement between said targets and said background scene and said cameras, each of said cameras having a video output connected to one of a plurality of blanking and synthesizing means, a television display means connected to each blanking and synthesizing means, means for causing said camera means to scan said background scene and said target means whereby a composite image of said background and target means appears on said display means, apparent motion means connected to said camera means, target course control means, motion control computer means, and connecting means whereby the images of said target means appearing on said display means change azimuth, elevation, range, and course in accordance with input information from said target course control means as computed by said computer means.

References Cited

UNITED STATES PATENTS 2,611,819  9/1952  Serrell _____ 178—6

ROBERT L. GRIFFIN, Primary Examiner

B. L. LEIBOWITZ, Assistant Examiner

U.S. Cl. X.R.

178—6; 35—25